Patented June 16, 1931

1,810,318

UNITED STATES PATENT OFFICE

OSKAR LOEHR, OF UERDINGEN-ON-THE-RHINE, GERMANY, ASSIGNOR TO I. G. FARBEN-INDUSTRIE AKTIENGESELLSCHAFT, OF FRANKFORT-ON-THE-MAIN, GERMANY

PRODUCTION OF ESTERS OF GLYCOLS

No Drawing. Application filed October 16, 1926, Serial No. 142,152, and in Germany October 21, 1925.

The invention relates to an improved process of producing esters of ethylene glycol and homologous glycols corresponding to the general formula

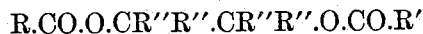

R.CO.O.CR''R''.CR''R''.O.CO.R' wherein R and R' mean hydrogen atoms or organic radicals such as alkyl- or phenyl-groups, while R'' represents hydrogen atoms or alkyl groups. More especially it relates to a process consisting in the action of ethylene oxide and its homologues on organic carboxylic acids.

The new process is based on the observation that, by heating with carboxylic acids in the ratio of two or more molecular weights of acid to each molecular weight of oxide, in the presence of certain catalysts, e. g. of strong inorganic acids or acid salts, ethylene oxide and its homologues, in simple reaction and with very high yields, are converted into such esters of the corresponding glycols, in which the two hydroxyl groups of the glycol are substituted by the radical of the carboxylic acid viz. acids employed as expressed by the general formula given above. By using ethylene oxide and acetic acid, ethylene glycol diacetate is obtained. The process may be carried out by adding to an organic carboxylic acid a little amount of a strong mineral acid e. g. sulfuric acid, or an acid reacting salt of such an acid e. g. sodium bisulfate, heating and stirring the mixture and passing the vapours of ethylene oxide or of one of its homologues into the fluid. Neutral salts such as the alkali salts of carboxylic acids, too, may serve as catalysts. If instead of one carboxylic acid, mixtures of such acids are employed, a certain amount of mixed esters is also obtained i. e. esters in which the two radicals R and R' of the above mentioned formula are different.

In order to illustrate more fully the nature of this invention the following examples are given, but the invention is not restricted to these examples:

1. In an acid-proof vessel with agitator and reflux condenser 500 kgs. of glacial acetic acid in which 10 kgs. of concentrated sulfuric acid are dissolved, are heated to 55–60° C., and the vapours of 88 kgs. of ethylene oxide admitted through a tube reaching sufficiently below the surface of the liquid. The ethylene oxide is completely absorbed. After all the ethylene oxide is introduced, the mixture is brought to ebullition for a short time, the sulfuric acid neutralized by the equivalent amount of calcium carbonate and the liquid distilled preferably in vacuo with the aid of a fractionating column. Besides unchanged acetic acid 265 kgs. of ethylene glycol diacetate (b. p. 186–187° C. under normal pressure, density 1.128) are obtained.

2. In the same apparatus 500 kgs. of acetic acid, in which 10 kgs. of sodium bisulfate are suspended, are heated to 120° C. and the vapours of 150 kgs. of propylene oxide introduced. By further treating of the reacting mixture in the same manner as set forth in the foregoing example, 350 kgs. of propylene glycol diacetate (b. p. 186°, density 1.109) are obtained.

3. 122 kgs. of benzoic acid melted and heated to 130°, are mixed with 5 kgs. of sodium benzoate and the vapours of 25 kgs. of ethylene oxide passed in, under stirring, temperature being raised slowly to 170° C. In order to remove unchanged benzoic acid, the reaction mixture still warm is extracted with a diluted warm solution of sodium carbonate and after cooling down and freezing filtrated from the aqueous solution and oily parts. Glycol dibenzoate is left on the filter and obtained in pure form (m. p. 73—74°) by crystallizing from methanol.

4. 220 kgs. of ethylene oxide are passed into 1000 kgs. of formic acid containing 10 kgs. of concentrated sulfuric acid, temperature raising from room temperature up to 75° C. owing to reaction heat. All the ethylene oxide having been absorbed, the liquid is boiled under reflux for three hours, freed from sulfuric acid by neutralizing with the equivalent amount of calcium carbonate and distilled, suitably under reduced pressure. Besides unchanged formic acid 540 kgs. of ethylene glycol diformate (b. p. 174° C./760 mm., density 1.193) are obtained.

I claim:

1. The process which comprises reacting at least two molecular proportions of a mono carboxylic acid with one molecular proportion of a mono olefine oxide at a temperature between about 50° C. and the boiling point of the reaction mixture and in the presence of an esterification catalyst.

2. The process which comprises reacting at least two molecular proportions of a mono carboxylic acid with one molecular proportion of a mono olefine oxide at a temperature between about 50° C. and the boiling point of the reaction mixture and in the presence of a small amount of a strongly acid inorganic compound.

3. The process which comprises reacting at least two molecular proportions of a mono carboxylic acid with one molecular proportion of a mono olefine oxide at a temperature between about 50° C. and the boiling point of the reaction mixture and in the presence of a small amount of sulfuric acid.

4. The process which comprises reacting at least two molecular proportions of a mono carboxylic acid with one molecular proportion of ethylene oxide at a temperature between about 50° C. and the boiling point of the reaction mixture and in the presence of an esterification catalyst.

5. The process which comprises reacting at least two molecular proportions of acetic acid with one molecular proportion of ethylene oxide at a temperature between about 50° C. and the boiling point of the reaction mixture and in the presence of an esterification catalyst.

6. An improved process of producing ethylene glycol diacetate which comprises introducing the vapors of 88 kgs. of ethylene oxide into a mixture of 500 kgs. of glacial acetic acid and 10 kgs. of concentrated sulfuric acid at a temperature of about 55–60° C., while stirring, and boiling the reaction mixture for a short time.

In testimony whereof I have hereunto set my hand.

OSKAR LOEHR.